(12) United States Patent
Davidson et al.

(10) Patent No.: US 6,208,349 B1
(45) Date of Patent: Mar. 27, 2001

(54) MULTIDIMENSIONAL DISPLAY CONTROLLER FOR DISPLAYING TO A USER AN ASPECT OF A MULTIDIMENSIONAL SPACE VISIBLE FROM A BASE VIEWING LOCATION ALONG A DESIRED VIEWING ORIENTATION

(75) Inventors: George S. Davidson; Thomas G. Anderson, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 08/834,616

(22) Filed: Apr. 14, 1997

(51) Int. Cl.[7] .................................................. G06T 15/00
(52) U.S. Cl. ............................................................. 345/427
(58) Field of Search ..................................... 345/419, 420, 345/425–433, 441, 355–358

(56) References Cited

U.S. PATENT DOCUMENTS

| | | | |
|---|---|---|---|
| 4,028,725 | * 6/1977 | Lewis | 348/115 |
| 4,811,608 | * 3/1989 | Hilton | 73/862.043 |
| 5,296,871 | 3/1994 | Paley | 345/163 |
| 5,506,605 | 4/1996 | Paley | 345/163 |
| 5,742,264 | * 4/1998 | Inaaaki et al. | 345/8 |

OTHER PUBLICATIONS

Creve Maples, "Muse, A Functionality–Based Human–Computer Interface," *Journal of Virtual Reality*, vol. 1, Winter 1995.

* cited by examiner

*Primary Examiner*—Almis R. Jankus
(74) *Attorney, Agent, or Firm*—V. Gerald Grafe

(57) ABSTRACT

A display controller allows a user to control a base viewing location, a base viewing orientation, and a relative viewing orientation. The base viewing orientation and relative viewing orientation are combined to determine a desired viewing orientation. An aspect of a multidimensional space visible from the base viewing location along the desired viewing orientation is displayed to the user. The user can change the base viewing location, base viewing orientation, and relative viewing orientation by changing the location or other properties of input objects.

10 Claims, 4 Drawing Sheets

MULTIDIMENSIONAL DISPLAY CONTROLLER FOR DISPLAYING TO A USER AN ASPECT OF A MULTIDIMENSIONAL SPACE VISIBLE FROM A BASE VIEWING LOCATION ALONG A DESIRED VIEWING ORIENTATION

This invention was made with Government support under Contract DE-AC04-94AL85000 awarded by the U. S. Department of Energy. The Government has certain rights in the invention.

BACKGROUND OF THE INVENTION

This invention relates to the field of display of multidimensional space, specifically apparatus for controlling the display of selected portions of a multidimensional space to a user and adapted for use with computer systems in virtual reality environments.

Computer visualization and interaction systems such as that described by Maples in "Muse, A functionality-based Human-Computer Interface," Journal of Virtual Reality, Vol. 1, Winter, allow humans to interact with multidimensional information represented in a multidimensional space. Such information can represent many types of virtual reality environments, including the results of scientific simulations, engineering analysis, what-if scenarios, financial modeling, three dimensional structure or process design, stimulus/response systems, and entertainment.

In many of the applications, the multidimensional space contains too much information for the user to view or assimilate at once. Displaying different aspects of the multidimensional space can also aid human understanding. Consequently, the user must select portions of the space for viewing, usually by changing the position and orientation of the human's viewpoint into the multidimensional space. The human must navigate to different what-if scenarios, to visualize different parts of a simulation or model result, to visit different parts of a structure or process design, and to experience different stimulus/response situations or different entertainment features. While the ubiquitous mouse has all but conquered navigation in two-dimensional spaces, navigation in higher dimensions is still problematic.

The mouse and joysticks have seen use as multidimensional display controllers. They are inherently two-dimensional devices, however, and are not intuitive to use when adapted for use in more dimensions.

A three-dimensional spaceball has also seen use as a multidimensional display controller. A spaceball remains stationary while the user pushes, pulls, or twists it. The spaceball does not provide intuitive control of motion because the spaceball itself cannot move. A spaceball can control relative motion, but is ill-suited for large displacement or absolute motion. Booms and head mounted displays combine visualization display with multidimensional display control and can be intuitive to use in multidimensional applications. Booms and head mounted displays can be expensive, however, and the physical limits of the boom structure can limit intuitive navigation. For example, booms typically require an additional input device to control velocity. Booms can control relative motion, but are ill-suited for large displacement or absolute motion.

Other motion devices such as treadmills and stationary bicycles have seen use in multidimensional display control. These are often expensive and too bulky for desktop use. They are also intrusive, often requiring the user to be strapped in to the device. Changing directions in the dimensions using a treadmill or bicycle can also be non-intuitive.

Multi-dimensional tracked objects have also seen use as multidimensional display controllers. These can be intuitive since they can move in multiple dimensions, but they do not allow nonvisual feedback to the user. Tracking can also be difficult when, for example, an electromagnetically tracked device is used near large metal items or an acoustically tracked device is used in settings where line of sight is difficult to maintain.

There is an unmet need for multidimensional display controllers that are intuitive to use, suitable for desktop use, and robust enough for use in a wide range of multidimensional display situations.

SUMMARY OF THE INVENTION

The present invention provides a multidimensional display controller adapted for use with multidimensional information, especially for use in virtual reality or other computer displays. The display controller allows a user to establish a base viewing location and a base viewing orientation. The user can also establish a relative viewing orientation. The display controller combines the base viewing orientation and relative viewing orientation to determine a desired viewing orientation. The display controller depicts an aspect of the multidimensional space visible from the base viewing location along the desired viewing orientation. The user can establish the base viewing location and base viewing orientation by moving a user-defined point relative to the multidimensional space or relative to a separate reference frame. The user can change the relative viewing orientation by changing the location, orientation, deformation, or other property of an input object. The relative viewing orientation can also be changed by tracked user body motions, for example by tracked motion of the user's head or eyes.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
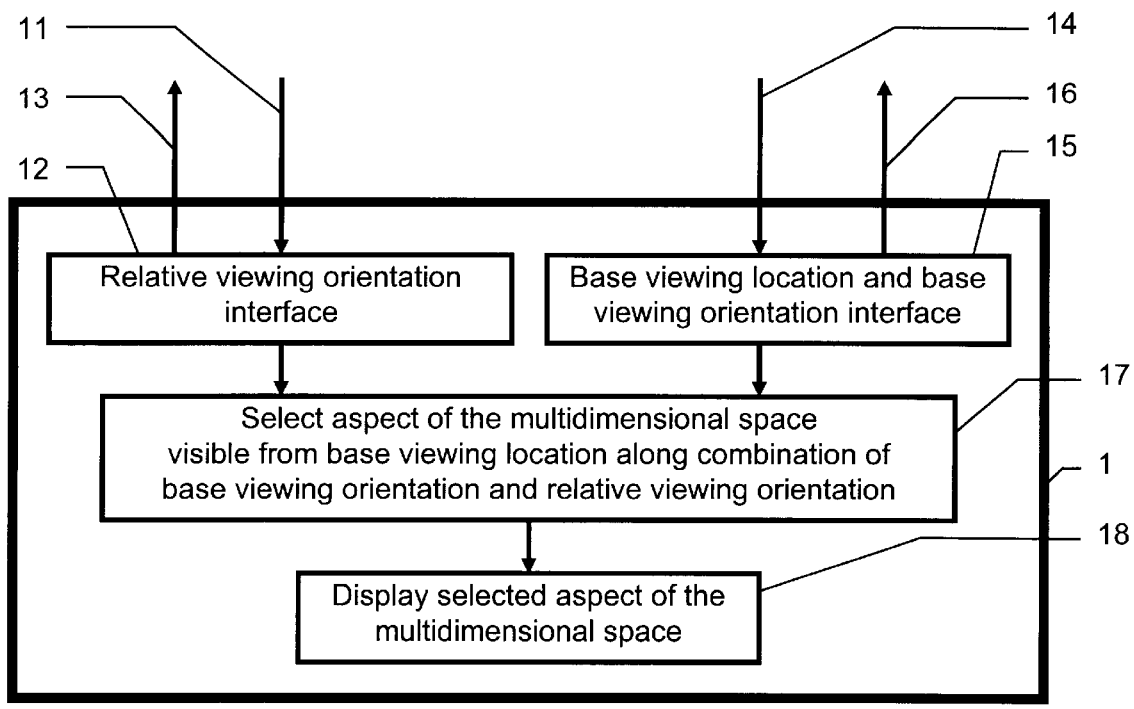
FIG. 1 is an illustration of the information flow in a multidimensional display controller according to the present invention.

The present invention provides a display controller adapted for use with multidimensional information, especially for use in virtual reality or other computer displays. FIG. 1 illustrates the information flow in a display controller 1 according to the present invention. A user can provide input 14 to indicate a base viewing location and base viewing orientation. Base viewing location and base viewing orientation interface 15 transforms the user input 14 to establish a base viewing location and base viewing orientation, and can provide feedback 16 associated with the base viewing location and base viewing orientation to the user. The user can also provide input 11 to indicate a relative viewing orientation. Relative viewing orientation interface 12 transforms the user input 11 to establish a relative viewing orientation, and can provide feedback 13 associated with the relative viewing orientation to the user. The display controller 1 combines the base viewing orientation and relative viewing orientation to establish a desired viewing orientation. The aspect of the multidimensional space visible from the base viewing location along the desired viewing orientation is selected 17. The display controller 1 depicts the selected aspect 18 to the user.

Figure 2:
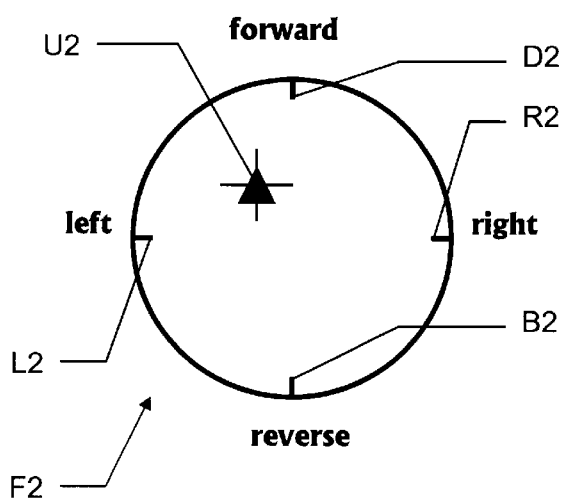
FIG. 2 is an illustration of a reference frame and user point for control of base viewing location and base viewing orientation according to the present invention.

The user can move the base viewing location and base viewing orientation by moving a user-defined point relative to the multidimensional space or relative to a separate reference frame. For example, the base viewing location can be translated through the multidimensional space in response to user translation of a device such as that described in U.S. Pat. Nos. 5,506,605 and 5,296,871, incorporated herein by reference. The base viewing location and base viewing orientation can also navigated through the multidimensional space by other user input such as voice commands. The display controller 1 can establish a separate reference frame. The separate reference frame can correspond to allowable directions and velocities of motion of the base viewing location and base viewing orientation. The direction of base viewing location motion can be determined from user motion commands or can be set relative to the base viewing orientation. Force or other feedback means can help make user motion of the base viewing location and base viewing orientation more intuitive. Representing the base viewing location and base viewing orientation as the location and orientation of a user-navigable craft can make navigation thereof intuitive. FIG. 2 shows a reference frame F2 for controlling the base viewing location and base viewing orientation. The base viewing location can be translated forward D2 or back B2 and left L2 or right R2. The directions of translation are relative to the base viewing orientation, so that when the user points the base viewing orientation in a specific direction the forward direction of location translation points the same direction. This loosely corresponds, for example, to driving a conventional automobile where the driver always looks straight ahead. The user can establish the base viewing orientation in various ways. For example, the user can issue a command by voice or button to enable rotation of reference frame F2. The base viewing orientation would follow the rotation of reference frame F2. The user can thus control the base viewing orientation as though the user was in a craft capable of pointing in any direction.

For control of the base viewing location, a tracked device can be used to move a user point U2 relative to reference frame F2. Force, visual, or other feedback can be used to indicate the position of the user point U2 relative to the reference frame F2. The base viewing location can be moved in a direction derived from the base viewing orientation and the location of the user point U2 relative to the reference frame F2. The base viewing location can be moved at a velocity corresponding to the distance of the user point U2 from the reference frame F2 or the force applied by the user to the tracked device. The user can thus control the base viewing location as though the user were in a craft capable of motion in any direction.

Reference frame F2 can be communicated to the user in various ways. It can be displayed. It can conform to the frame of the navigable or multidimensional space, or to a reference frame corresponding to a navigable entity surrounding the user. The reference frame can be displayed as a sphere, ellipsoid, or polyhedron (in three dimensions) on the dashboard of a navigable entity, or can be displayed as a spatial form hovering near the user's head or where the user might expect to find a steering wheel in a conventional craft. The reference frame displayed can change under user control, or multiple reference frames can be displayed for the user to select.

Control from the user can be accepted in various other ways, including, for example, from force applied by the user to a pointer, from sound commands from the user, from pressure on a pressure sensitive input means, or from tracking selected user movements. The feedback to the user of the position of the user point relative to the reference frame can be done visually. It can also be accomplished with sound, for example by changing pitch or intensity as the desired viewing location and orientation change. It can also be accomplished by force feedback, for example by applying progressive resistance to movement away from a base viewing location or orientation. It can also be accomplished by other methods such as by varying the temperature of an input device, the speed of air flow over the user, or by varying vibrations in an input device, for example. The implementation of suitable sensor communication and control software is known to those skilled in the art.

Figure 3:
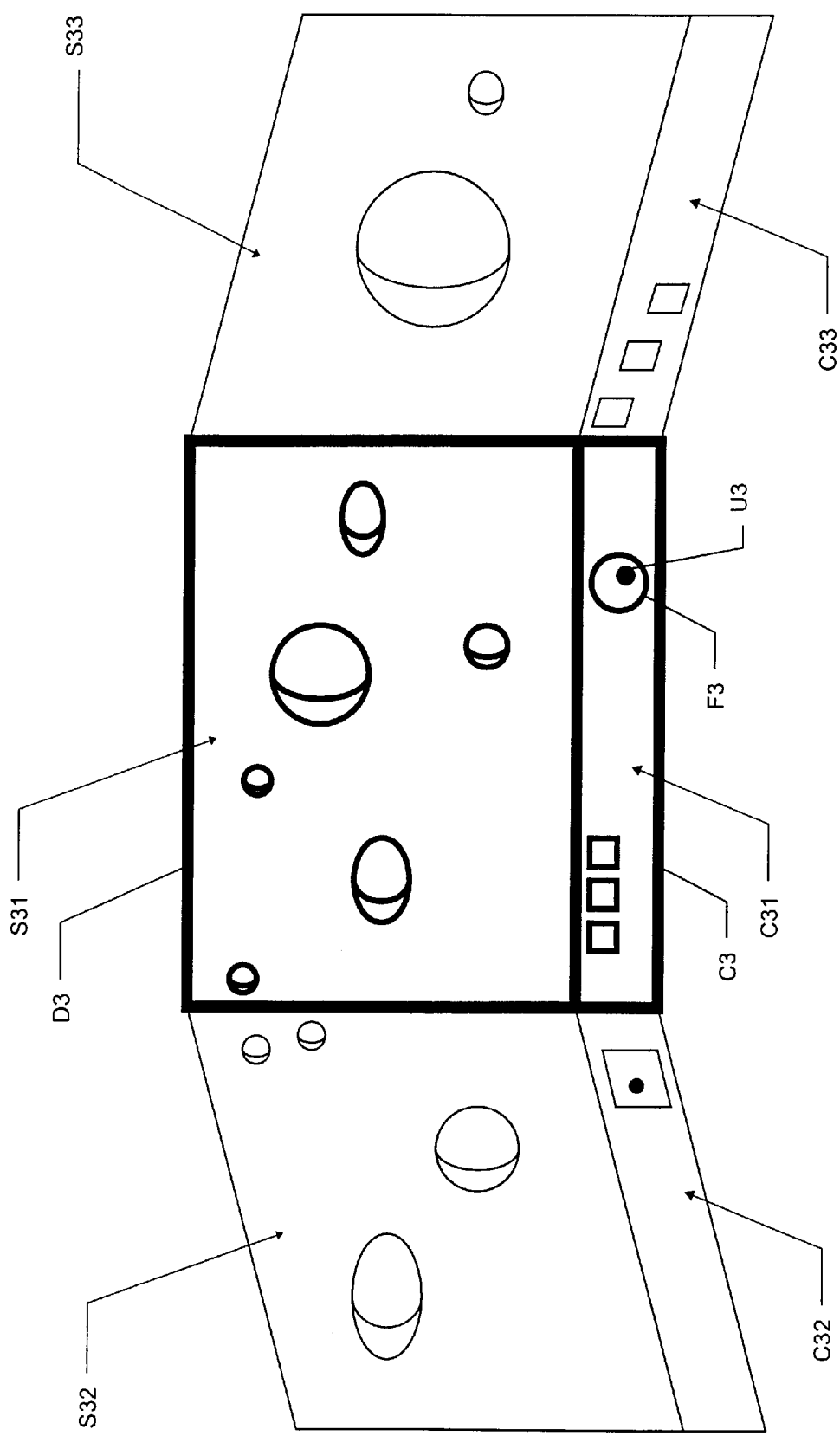
FIG. 3 is an illustration of a multidimensional display with base viewing location, base viewing orientation, and relative viewing orientation according to the present invention.

FIG. 3 is an illustration of three different aspects S31, S32, S33 a multidimensional space with base viewing location, base viewing orientation, and relative viewing orientation according to the present invention. The user can see the information displayed in display D3 and in control panel display C3. The user can see the aspect S31 of the multidimensional space displayed in display D3. The user can also see an assortment of controls in control panel C31 displayed in control panel display C3. Control panel display C3 and display D3 can be the same or different display devices. The aspect S31 displayed corresponds to the aspect of the multidimensional space visible from a base viewing location along a viewing orientation determined from a base viewing orientation and a relative viewing orientation. The user can manipulate user point U3 relative to reference frame F3 to change the base viewing location and base viewing orientation. The user can change the relative viewing orientation by separate input, such as those discussed below.

Rotating the relative viewing orientation to the left, without changing the base viewing location or base viewing orientation, will cause another aspect S32 of the multidimensional space to be displayed to the user in display D3. The control panel display C3 can continue to display the original control panel C31 when the relative viewing orientation is changed, corresponding to a fixed instrument panel like in a convention automobile. Alternately, the control panel display C3 can change to display the controls in control panel C32, corresponding to a cockpit that moves with the user or a heads up display.

Rotating the relative viewing orientation to the right, without changing the base viewing location or base viewing orientation, will cause another aspect S33 of the multidimensional space to be displayed to the user in display D3. The control panel display C3 can continue to display the original control panel C31 when the relative viewing orientation is changed, corresponding to a fixed instrument panel like in a convention automobile. Alternately, the control panel display C3 can change to display the control in control panel C33, corresponding to a cockpit that moves with the user or a heads up display.

Allowing separate user control of the relative viewing orientation has several benefits. The modification of viewing orientation separate from the control panel or other indicators of viewing position can help the user retain a spatial reference. In some applications, the user desires to change the viewing orientation much more rapidly than the viewing location (as when looking around when driving a car); using a free hand to control relative viewing orientation provides a low overhead way of accommodating the desired viewing orientation changes.

The relative viewing orientation can be changed by the user by changing the location, orientation, deformation, or other property of an input object. For example, the user can rotate a tracked object to rotate the relative viewing orientation. The user can also apply torque to an object to rotate the relative viewing orientation. Changes in other properties of an object can also be used to change the relative viewing orientation; for example, translation or deformation of an object can correspond to rotation of the relative viewing orientation. The relative viewing orientation can also be changed by tracked user body motions, for example by tracked motion of the user's hand, head or eyes.

Figure 4:
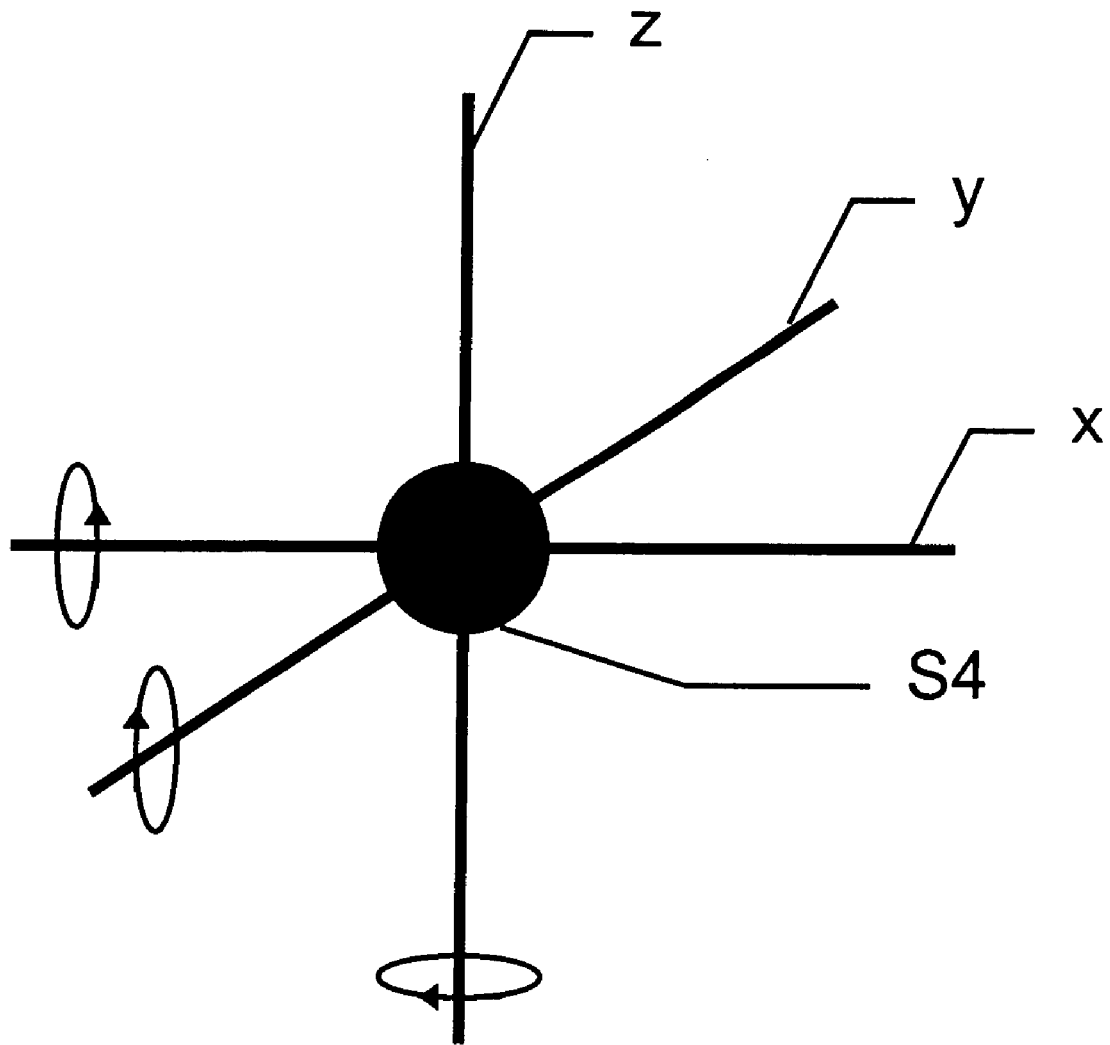
FIG. 4 is an illustration of a device that can control the relative viewing orientation.

FIG. 4 illustrates a device that can control the relative viewing orientation. A sphere S4 is capable of rotation about three axes x, y, z. The display controller can track rotation of the sphere S4, and rotate the relative viewing orientation based on the rotation of the sphere S4. Intuitive user control can be fostered by allowing the device to represent the user's head. Rotating the device would accordingly effect a change in the displayed aspect corresponding to the rotation of the device.

Figure 5:
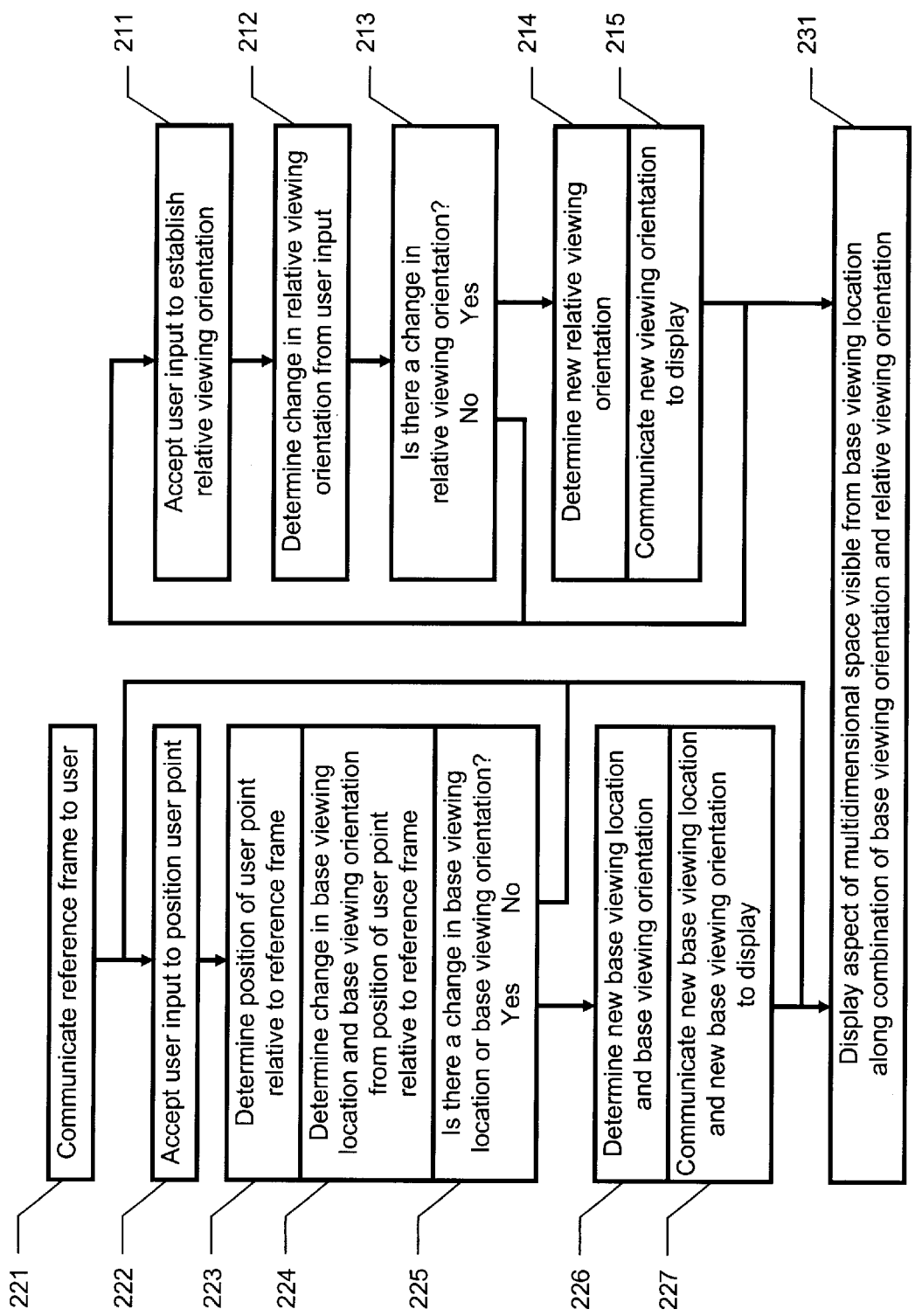
FIG. 5 is a flow diagram of computer software suitable for use with the present invention.

FIG. 5 is a flow diagram of a computer software implementation of a display controller according to the present invention. The display controller communicates a reference frame to the user 221. Those skilled in the art will appreciate various methods for accomplishing this, such as, for example, incorporating the reference frame into the image displayed to the user. Driver software specific to the user input device chosen accepts user input 222 for establishment of the position of a user point. The display controller determines the position of the user point relative to the reference frame 223. The relative position indicates whether the base viewing location and base viewing orientation have changed 224. If they have not changed 225, then the current base viewing location and viewing orientation are still valid, pending new user input 222. If the base viewing location or base viewing orientation has changed 225, then the display controller determines the new base viewing location or base viewing orientation 226. Those skilled in the art will appreciate various methods for determining the new base viewing location or base viewing orientation based on the relative position and the desired viewing location and viewing orientation navigation performance. The new base viewing location and base viewing orientation is communicated 227 to the display software.

The display controller also comprises appropriate driver software to accept user input for establishment of the relative viewing orientation 211. Those skilled in the art will appreciate suitable driver software corresponding to the input device employed. The user input can indicate a change in relative viewing orientation 212. If it indicates no change 213, then the current relative viewing orientation is still valid, pending new user input 211. If the relative viewing orientation has changed 213, then the display controller determines the new relative viewing orientation. Determination of the new relative viewing orientation can be based on numerous types of user input; those skilled in the art will appreciate methods for determining the relative viewing orientation based on the input device employed and the desired user responsiveness characteristics. The new relative viewing orientation is communicated to the display software 215.

The display software interacts with the multidimensional data to select the aspect visible from the base viewing location along a viewing orientation determined from a combination of the base viewing orientation and the relative viewing orientation. Those skilled in the art will appreciate methods of selecting aspects of multidimensional data for display. The display controller displays the selected aspect to the user 231.

A display controller according to the present invention was implemented using a Silicon Graphics Indigo II High Impact workstation running the IRIX 6.2 operating system. A PHANTOM™ from SensAble Technologies of Cambridge, Mass. was used as the means for allowing the user to set a user point, and for communicating force feedback to the user. Rotation of encoders on the PHANToM™ was used for viewing orientation input. The PHANTOM™ was connected to the workstation's EISA communications port. Torque encoders on a spaceball, U.S. Pat. No. 4,811,608, from Spacetec were used to sense torque applied by the user to determine changes in relative viewing orientation desired by the user. The display controller was operated with a virtual reality environment like that described by Maples in "Muse, A functionality-based Human-Computer Interface," Journal of Virtual Reality, Vol. 1, Winter 1995.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A multidimensional display controller for displaying to a user an aspect of a multidimensional space visible from a base viewing location along a desired viewing orientation, comprising:
 a) reference means for displaying to the user a reference frame having n dimensions, where n is at least two;
 b) input means responsive to the user for determining the position of a user point relative to the reference frame;
 c) feedback means for communicating to the user the position of the user point;
 d) means for establishing the base viewing location and a base viewing orientation from the position of the user point relative to the reference frame;
 e) orientation means responsive to the user for establishing a relative viewing orientation;
 f) combination means for determining the desired viewing orientation from the base viewing orientation and the relative viewing orientation; and
 g) display means for displaying to the user the aspect of the multidimensional space visible from the desired viewing location along the desired viewing orientation.

2. The display controller of claim 1, wherein the orientation means comprises:
   a) means for accepting voice commands from the user; and
   b) means for establishing a relative viewing orientation based on the voice commands.

3. The display controller of claim 1, wherein the orientation means comprises:
   a) means for determining changes in the orientation of the user's eyes; and
   b) means for establishing a relative viewing orientation based on changes in the orientation of the user's eyes.

4. The display controller of claim 1, wherein the orientation means comprises:
   a) an object manipulable by the user;
   b) means for detecting changes in a property of the object;
   c) means for establishing a relative viewing orientation based on changes in a property of the object.

5. The display controller of claim 4, wherein the property is chosen from the group consisting of: the position of the object, the orientation of the object, pressure incident on the object, torque applied to the object, deformation of the object, and combinations thereof.

6. The display controller of claim 4, wherein the object represents the user's head.

7. The display controller of claim 1, wherein the input means comprises an object moveable by the user, and wherein the feedback means comprises means for applying resistance to the movement of the object.

8. The display controller of claim 1, wherein the feedback means comprises means for displaying to the user a representation of the reference frame and means for displaying to the user the position of the user point relative to the reference frame.

9. The display controller of claim 8, wherein n is three, and the spatial form is chosen from the group consisting of: ellipsoid, polyhedron.

10. The display controller of claim 1, wherein the reference means comprises means to display to the user a spatial form having n dimensions.

* * * * *